UNITED STATES PATENT OFFICE.

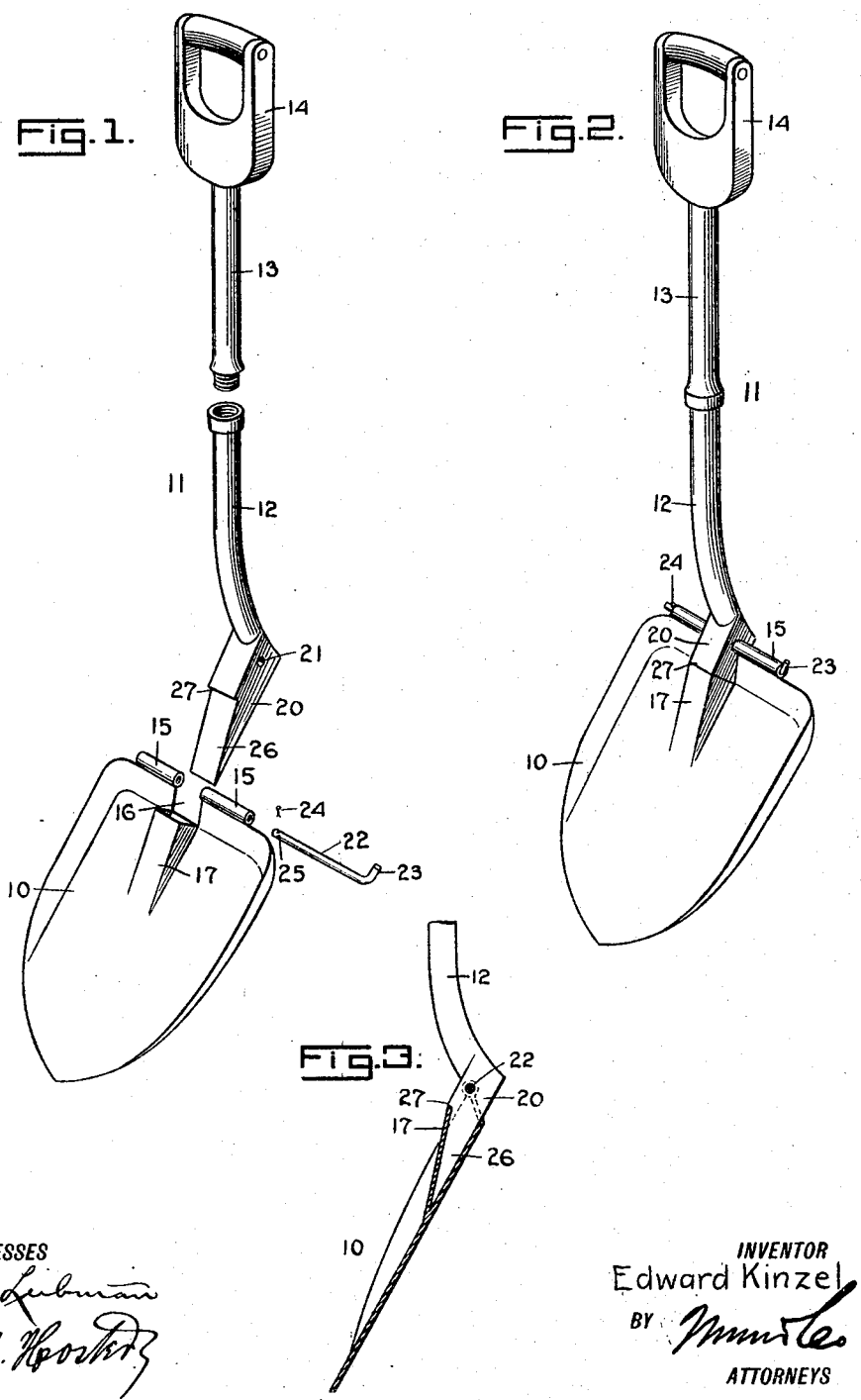

EDWARD KINZEL, OF ALBANY, NEW YORK.

IMPLEMENT.

1,211,175.  Specification of Letters Patent.  Patented Jan. 2, 1917.

Application filed June 30, 1916. Serial No. 106,801.

*To all whom it may concern:*

Be it known that I, EDWARD KINZEL, a citizen of the United States, and a resident of Albany, in the county of Albany and State of New York, have invented a new and Improved Implement, of which the following is a full, clear, and exact description.

The invention relates to implements such as shown and described in the Letters Patent of the United States, No. 1,188,183, granted to me on June 20, 1916.

The object of the invention is to provide a new and improved implement such as a shovel, spade or the like, arranged to permit of quickly and securely assembling and fastening together the handle and blade without the use of special tools, or to disassemble the parts with a view to form the same into a small bundle for convenient carrying in a knapsack, bag, grip or other similar receptacle.

In order to produce the desired result, use is made of a blade and a separable handle connected with each other, the blade being provided with a socket located forward of the connection and the said handle having a forwardly extending arm engaging the said socket.

A practical embodiment of the invention is represented in the accompanying drawings forming a part of this specification, in which similar characters of reference indicate corresponding parts in all the views.

Figure 1 is a perspective view of the shovel, with parts in a disassembled position; Fig. 2 is a like view of the shovel with the parts assembled; and Fig. 3 is a sectional side elevation of the same.

The implement in its general construction consists of a blade or a scoop 10 and a handle 11, which latter is preferably made in two parts 12 and 13 screwed together and of which the outer part 13 is provided with a handhold 14. The blade or scoop 10 is provided at its base with spaced eyes 15 in transverse alinement with each other and this end of the blade 10 is provided with a cut-out portion 16, the sides of which are flush with the inner ends of the eyes 15. The blade or scoop 10 is provided in front of the eyes 15 with a socket 17, the entrance to which is had through the cut-out portion 16, as will be readily understood by reference to Fig. 1. The socket 17 is made tapering and merges with its forward end in the body of the blade or scoop 10. The handle section 12 is provided with a forwardly extending arm 20 fitting into the cut-out portion 16, as plainly shown in Figs. 2 and 3, and the said handle section 12 is provided at the junction with the arm 20 with a transverse aperture 21 in alinement with the opening in the eyes 15. A pintle 22 is adapted to pass through the eyes 15 and through the aperture 21 to connect the handle section 12 with the blade or scoop 10. The pintle 22 is provided at one end with an angular offset 23 serving as a handle for conveniently placing the pintle in position in the eyes 15 and the aperture 21 or removing it therefrom whenever it is desired to disassemble the parts. A cotter pin 24 is adapted to be engaged with an aperture 25 in the other end of the pintle 22 after the latter is inserted in the eyes 15 and the aperture 21 to securely lock the pintle in position in the eyes and handle. The arm 20 is provided at its forward end with a tapering extension 26 adapted to fit into the socket 17, and the said extension forms with the arm 20 a shoulder 27 abutting against the top of the socket 17.

It will be noticed that in assembling the blade 10 and the handle 11, the extension 26 is engaged with the socket 17 so that the arm 20 extends in the cut-out portion 16 and the aperture 21 registers with the openings in the eyes 15. The pintle 22 is now inserted and fastened in place by the cotter pin 24.

By the arrangement described the parts can be readily assembled without the use of any special tool and the assembled parts are securely locked in place so that the implement can be readily used for shoveling, digging or other similar purposes.

When it is desired to disassemble the parts for forming the same into a small bundle for carrying or transportation purposes, then the cotter pin 24 and the pintle 22 are removed to allow of withdrawing the extension 26 of the handle from the socket 17, and then the pintle 22 may be reinserted in the eyes 15 and the aperture 21 with the arm 20 and extension 26, however, out of engagement with the socket 17 so that the handle can be readily swung onto the blade or scoop with the parts taking up very little room.

The implement shown and described is very simple and durable in construction and is very serviceable for the use of linemen, trackmen, campers, civil and mining engineers, automobilists and other persons desiring to carry a shovel or a spade along especially as the implement shown and described can be folded into a comparatively small bundle for convenient carrying in a knapsack, hand bag, grip or other similar receptacle.

Having thus described my invention, I claim as new and desire to secure by Letters Patent:

1. A shovel, spade or similar instrument comprising a blade and a separable handle connected with each other, the blade having a cut out portion at the base and a socket in front of the cut out portion, and the said handle having an arm fitting in the cut-out portion and engaging the said socket.

2. A shovel, spade or similar instrument, comprising a blade and a separable handle connected with each other, the blade having a cut-out portion at the base and a socket located forward of the cut-out portion and the said handle having a forwardly extending arm the rear portion of which fits into said cut-out portion and the forward end of which engages the said socket, and means for detachably fastening the handle and blade together.

3. A shovel, spade or a similar instrument, comprising a blade and a handle connected with each other, the blade being provided at its base with transversely extending registering eyes spaced apart, the blade having a cut-out portion at the base between the said eyes and the blade having a socket in front of the cut-out portion, the said handle having a transverse aperture registering with the said eyes, the said handle having a forwardly extending angular arm the rear portion of which fits into the said cut-out portion and the forward end of which fits into the said socket, and a pintle removably held in the said eyes and passing through the aperture in the handle.

EDWARD KINZEL.

Copies of this patent may be obtained for five cents each, by addressing the "Commissioner of Patents, Washington, D. C."